United States Patent [19]
Peterson

[11] Patent Number: 5,766,466
[45] Date of Patent: Jun. 16, 1998

[54] SECTORS FOR ROTARY DISC FILTERS HAVING FLOW CHANNELS THAT ARE PARALLEL AND ALIGNED TOWARD ELONGATE SIDE CHANNELS AT RADIAL SIDES OF THE SECTOR

[76] Inventor: John Gary Peterson, #4 Chelsea La., Vicksburg, Miss. 39180

[21] Appl. No.: 665,723

[22] Filed: Jun. 18, 1996

Related U.S. Application Data

[60] Provisional application No. 60/000,344, Jun. 20, 1995.
[51] Int. Cl.$^6$ ................................ B01D 29/39
[52] U.S. Cl. .................. 210/323.1; 210/346; 210/486; 210/497.3; 210/498; 4/608; 4/609; 119/508; 119/509; 119/529
[58] Field of Search .................. 210/323.1, 345, 210/346, 486, 487, 488, 494.1, 494.3, 495, 497.01, 497.3, 497.2, 498; 4/608, 609; 119/508, 509, 529

[56] References Cited

U.S. PATENT DOCUMENTS

| | | | |
|---|---|---|---|
| 3,799,490 | 3/1974 | Bunger | 249/18 |
| 3,826,230 | 7/1974 | Jones et al. | 119/28 |
| 4,216,093 | 8/1980 | Kane | 210/346 |
| 5,046,338 | 9/1991 | Luthi | 68/43 |
| 5,113,794 | 5/1992 | Rahm | 119/28 |
| 5,222,261 | 6/1993 | Tooze et al. | 4/608 |
| 5,227,065 | 7/1993 | Strid | 210/486 |
| 5,238,564 | 8/1993 | Luthi | 210/346 |
| 5,258,120 | 11/1993 | Knodel et al. | 210/486 |
| 5,316,675 | 5/1994 | Frykhult | 210/346 |

*Primary Examiner*—W. L. Walker
*Attorney, Agent, or Firm*—Terry M. Crellin

[57] ABSTRACT

The present invention pertains to rotary disc filters and in particular to sectors for such filters. Drainage channels are formed in broad, planar surfaces of the filter media support member of the sector, with the drainage channels being parallel and aligned toward elongate side channels at radial sides of the sector. The sectors have elongate side channels at radial sides of the sector. The side channels can be connected to the central shaft of the rotary disc filter apparatus so that fluid flows directly from the side channels to fluid handling means in the central shaft of the filter apparatus. The present invention further discloses planar drainage members made of elongate slats that are aligned side-by-side slats so that adjacent slats are interengaged fashion. The drainage members have drainage channels formed in a broad, planar surface thereof, and the drainage members can be used as supports for filter media in rotary disc and drum filters as well as for platforms used for floors and the like in wet areas such as shower stalls.

26 Claims, 3 Drawing Sheets

SECTORS FOR ROTARY DISC FILTERS HAVING FLOW CHANNELS THAT ARE PARALLEL AND ALIGNED TOWARD ELONGATE SIDE CHANNELS AT RADIAL SIDES OF THE SECTOR

BACKGROUND OF THE INVENTION

1. Related Application

This application claims the benefit of U.S. Provisional application Ser. No. 60/000,344, filed Jun. 20, 1996.

2. Field of the Invention

The present invention relates to rotary disc filters and in particular to novel sectors for such filters, wherein drainage channels are formed in broad, planar surfaces of the filter media support member of the sector, with the drainage channels being parallel and aligned toward elongate side channels at radial sides of the sector. The present invention also relates to novel sectors having elongate side channels at radial sides of the sector, wherein the side channels are connected to the central shaft of the rotary disc filter apparatus so that fluid flows directly from the side channels to fluid handling means in the central shaft of the filter apparatus. In addition, the present invention further relates to planar drainage members made of elongate slats that are aligned side-by-side slats so that adjacent slats are interengaged fashion, wherein the drainage members have drainage channels formed in a broad, planar surface thereof and can be used as supports for filter media in rotary disc and drum filters as well as for platforms used for floors and the like in wet areas such as shower stalls.

3. State of the Art

There are various types of filters that utilize a moving filter medium. Disc filters utilize a rotating disc that revolves so that during a portion of its movement it is submerged in a liquor or slurry that is to be filtered. A drum filter is similar to a disc filter in that it revolves so that a portion of the drum is submerged in a liquor or slurry to be filtered. Common to both disc and drum filters, filter media is supported on a support member forming a sector of the disc or drum. The disc or drum rotates so that the surface of the filter medium is submerged beneath the surface of a slurry for a portion of its rotary travel, with filter cake being deposited on the surface of the filter medium when the filter medium is submerged. In the second portion of the rotary travel of the disc or drum, the filter medium travels in the atmosphere above the slurry, and filter cake is removed from the filter medium during the portion of its movement when it is not submerged in the slurry being filtered.

Disc filters are common in the filtration art, and the normal construction of a disc filter includes a series of relatively thin, circular disc members secured at rather close intervals along a shaft. Each disc is generally composed of a series of segments commonly called sectors. The sectors are covered by filter medium to provide filtering on both sides of the sector. The sectors have a peripheral frame holding a filter media support member. The filter media support member is a relatively thin, planar member having grooves formed in the broad, outer surfaces thereof to allow liquid being filtered to drain from the support member when the sector moves out of the slurry being filtered.

Heretofore, it has been the universal practice to slant the grooves in the filter media support member of each sector so that they extend inwardly from the outer circumference of the sector. The filter media support members have been made out of wood as well as cast from polymeric materials. The grooves of the filter media support members, whether made of wood or polymeric materials, have been directed inwardly from the periphery of the sector in a general direction toward a sector bell at the center of the filter apparatus.

The sectors of a disc filter have the general shape of a sector of a circle, with the center of the sector of the circle being truncated so that a sector bell can be attached to the sector. The filter media support member also has the general shape of a sector of a circle, with the tip of the sector truncated. Because of this sector-like shape, the universal practice of the prior art was to point the drainage grooves in the filter media support member toward the inner truncated end thereof that engages the sector bell of the filter apparatus. The inner ends of the drainage grooves must join with each other because of the shape of the sector. As a result of the complex geometry involved in the orientation of the drainage channels, water content of the filter cake deposited on the filter media is adversely effected.

When the filter media support member is made of a polymeric material, it has been necessary to cast the support member in the shape of the sector, with the grooves being formed in the surface of the support member as it is being cast. This is costly, requiring expensive molds and methods to cast the support member in the shape of a sector.

BRIEF DESCRIPTION AND OBJECTS OF THE INVENTION

According to the present invention I have discovered that it is highly advantageous to provide a filter media support member that has the general shape of the sector and is restrained between two elongate side channels extending outwardly from the central shaft of the disc filter apparatus so that the side channels diverge from each other to form the radial sides of the sector. Each side channel defines an open trough that faces the interior of the sector, with the trough positioned alongside a side edge of the filter media support member.

The filter media support member has elongate flow channels formed on opposite broad surfaces thereof. These flow channels are substantially parallel with each other as well as being aligned in a direction from a radial axis through the filter media support member toward the elongate side channels at the side edges of the filter media support member. Substantially all the flow channels in the filter media support member open into one of the elongate side channels that form radial sides of the sector. The advantage of having all the flow channels in the filter support media being oriented in a direction toward an elongate side channel at the radial sides of the sector is that as the sector rotates out of the slurry being filtered, the flow channels in the filter media support member are always oriented substantially vertically downwardly toward the surface of the slurry. As a result, liquid in the flow channels flows substantially vertically downward in a direct path to the trough formed by the elongate side channel at the radial side of the sector. Liquid from the flow channels is directed through the trough into the fluid handling system incorporated in the central shaft of the disc filter apparatus.

In a particularly preferred aspect of the present invention, it has been found that the filter media support member can be made of a polymeric or plastic material without requiring the support member to be cast. In this particularly advantageous embodiment of the invention, the filter media support member is formed from a plurality of elongate slats having two opposite upper and lower sides and two opposite lateral sides. The slats can be inexpensively extruded using conventional extrusion techniques, and the extruded slats can be cut to length and assembled to form the planar, filter media support member. To form the filter media support member, the slats are arranged in side-by-side manner so that an upper side of a slat lies alongside a lower side of an adjacent slat. The lateral sides of the slats are contoured so that the elongate flow channels of the filter media support member are formed between the slats at the opposite lateral sides of the slats when the slats are placed in their side-by-side arrangement to form the filter media support member.

In one preferred embodiment of the invention, the filter apparatus comprises a conventional sector bell that couples the sector to the central shaft of the rotary disc filter. Fluid flows from the flow channels in the filter media support member into the elongate side channels that form the radial sides of the sector. The fluid flows through the flow channels to the sector bell and then from the sector bell into the fluid handling system that is incorporated in the central shaft of the rotary disc filter. In an alternative, preferred embodiment of the invention, the conventional sector bell is eliminated. In this latter embodiment, the two elongate side channels of the sector extend directly to the central shaft of the rotary disc filter. The flow channels formed by the troughs of the elongate side channels connect directly to the central shaft to feed directly into the fluid handling system incorporated in the central shaft. Fluid flows directly from the flow channels of the elongate side channels to the fluid handling system of the central shaft of the rotary disc filter so as to eliminate any need of a sector bell that has otherwise universally been used on rotary disc filters.

It has further been found that the flat member formed from the slats in accordance with the present invention can be used as a drainage member for other applications other than a filter support member. For example a flooring material can be made for an area that is to be drained, such as a shower floor. Such a flat drainage member is formed from a plurality of elongate slats which are arranged in side-by-side manner so that a first side of a slat lies alongside a second side of an adjacent slat. An interengagement means such as a tongue and groove is formed on opposite sides of each of the slats so that adjacent slats can be engaged together. The top sides of the slats are contoured so that elongate flow channels are formed between the slats at the top sides of the slats when adjacent slats lie together in their side-by-side arrangement.

A principal object of the present invention is to provide a filter media support member for a rotary disc filter wherein the filter media support member has elongate flow channels formed on opposite broad surfaces thereof, with the flow channels being substantially parallel with each other and being aligned in a direction from a central, radial axis toward the opposite radial sides of the filter media support member.

Another object of the present invention is to provide a novel sector for a rotary disc filter that is attached directly to the central shaft of the filter apparatus without the use of a sector bell. Instead of having a sector bell connect the sector to the central shaft, the elongate side channels that form radial sides of the sector are connected directly to the central shaft of the rotary disc filter, and the flow channels formed by the side channels convey fluid from the sector directly to fluid handling means in the central shaft of the filter apparatus.

A further object of the invention is to provide a filter media support member that can be used in either a rotary disc filter or a drum filter, with such member being constructed of a plurality of elongate slats that are made of a polymeric material or another extrudable material such as aluminum, wherein (a) the slats are readily extruded using relatively inexpensive extrusion techniques, (b) the slats can be arranged in side-by-side manner and (c) the lateral sides of the slats are contoured so that elongate flow channels are formed between adjacent slats at the opposite lateral sides of the slats when the slats are arranged in their side-by-side arrangement.

A still further object of the invention is to provide a flat drainage member for use as a flooring or other surface in which drainage is desired, wherein the flat drainage member is constructed of a plurality of elongate slats that are made of a polymeric material. The slats of the drainage member are readily extruded using relatively inexpensive extrusion techniques, with the slats being arranged in side-by-side manner and with the lateral sides of said slats being contoured so that elongate flow channels are formed between adjacent slats at the opposite lateral sides of the slats when the slats are arranged in their side-by-side arrangement.

Additional objects and features of the invention will become apparent from the following detailed description, taken together with the accompanying drawings.

THE DRAWINGS

Preferred embodiments of the present invention representing the best modes presently contemplated of carrying out the invention are illustrated in the accompanying drawings in which.

DETAILED DESCRIPTION OF THE ILLUSTRATED EMBODIMENTS

Referring to the drawings, several embodiments of sectors for use with rotary disc filters and drainage members that can be used as part of the sectors to support the filter media are illustrated. Like parts in each of the figures of the drawings will be identified with the same reference numerals.

Three preferred embodiments of the present invention as related to a rotary disc filter are illustrated in FIGS. 1–10 of the drawings. A disc filter, as shown diagrammatically in FIG. 1 commonly has a plurality of similar wedge shaped filter sectors 10. The sectors 10 form a continuous disc, and the disc rotates about its central axis or hub. The disc rotates in approximately one-half of its travel beneath the surface of a pool of liquid, usually a slurry.

Each individual sector 10 is covered by a filter medium 12. Means as are commonly known in the art are used to draw a reduced pressure within the sector 10 as the sector is moving beneath the surface of the liquid. Liquid is drawn through the filter medium 12 as the sector 10 moves through the pool, and a filter cake is built up on the external surfaces of filter medium 12 covering the sector 10. The filter medium 12 is made of any usable type cloth or screen, including fiber cloth made from natural and synthetic fibers, woven wire cloths and screens. The filter medium 12 is shown in FIGS. 1–8 but has been broken away from the surface of the filter media support member 26 in FIGS. 2, 3 and 7 to show the flow channels 32 that are formed in the surface of the filter media support member 26.

As each sector 10 emerges from the pool and rotates above the pool, fluid is drained from the sector 10 through a series of flow channels (which will be described more fully hereinafter) in the sector 10. The fluid is fed from the flow channels in the sector 10 to a fluid handling system incorporated in the central shaft 14 of the filter apparatus. The fluid handling system incorporated in the central shaft 14 of the filter apparatus is well known in the art and will not be further described herein.

In one embodiment of the invention, the sector 10 of the present invention utilizes a conventional sector bell 16 that is mounted to the central shaft 14 of the filter apparatus and couples the sector 10, including the flow channels therein, to the central shaft 14. In a second embodiment of the invention, the sector bell 16 is eliminated, and flow passages are provided at the radial sides of the sector 10, with the flow passages being in direct flow communication with the fluid handling system incorporated in the central shaft 14 of the filter apparatus.

In accordance with one preferred embodiment of the present invention, a sector 10 is provided that comprises two elongate side channels 20 extending substantially radially outwardly from a central shaft 14 of the rotary disc filter. The side channels 20 diverge from each other to form the radial sides of the sector 10. As shown in FIGS. 2–5, the side channels have a generally U-shaped cross section so that each side channel defines an open trough that faces the interior of the sector 10. In the embodiment of the invention as illustrated in FIGS. 1–6, a sector bell 16 is attached to the central shaft 14 of the filter apparatus, and the side channels 20 are attached to the sector bell 16 so as to extend outwardly from the shaft 14 and the sector bell 16.

An elongate, arcuate, peripheral member 22 extends between distal ends of the side channels 20 to form an arcuate perimeter of the sector 10. The channel 22 is similar in shape to the side channels 20 in that each are elongate and generally have a U-shaped cross section. The channel 22 is arcuate whereas the channels 20 are essentially linear.

A substantially planar, filter media support member 26 is positioned between the two elongate channels 20 so as to occupy the inner space of the sector 10. The filter media support member 26 has its side edges received in the side channels 20 so that elongate fluid flow passages 30 are formed between the side edges of the support member 26 and the trough formed by the side channels 20. In the embodiment of the invention as illustrated in FIGS. 1–6, the filter media support member 26 extends between the two elongate side channels 20 and from the sector bell 16 to the elongate, arcuate, peripheral member 22.

The filter media support member 26 has elongate flow channels 32 formed on opposite broad surfaces thereof so that the flow channels 32 are substantially parallel with each other as well as being aligned in a direction from a radial axis through the filter media support member 26 toward the elongate side channels 20. Thus, substantially all of the flow channels 32 open into the elongate flow passages 30 formed in the elongate side channels 20.

The flow channels 32 conduct fluid from the sector 10 to the elongate flow passages 30 when the sector rotates above the surface of the slurry being filtered. As the sector 10 initially rotates out of the slurry, fluid contained in the sector 10 flows through the flow channels 32 toward the flow passage 30 in the trailing side channel 20. As the sector 10 continues over the top of its upward rotation and begins its downward travel toward the slurry, any residual fluid in the sector flows to the flow passage 30 in the leading side channel 20. The elongate flow passages 30 in the side channels 20 conduct the fluid from the sector 10 to the fluid handling system of the central shaft 14 of the filter apparatus.

Figure 1:
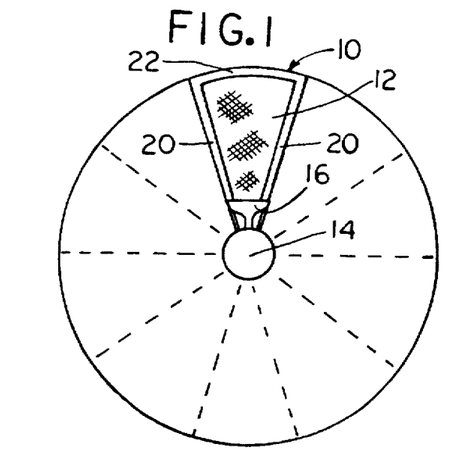
FIG. 1 is a schematic view of a sector and its positioning on a shaft to form a portion of a disc filter.
Figure 2:
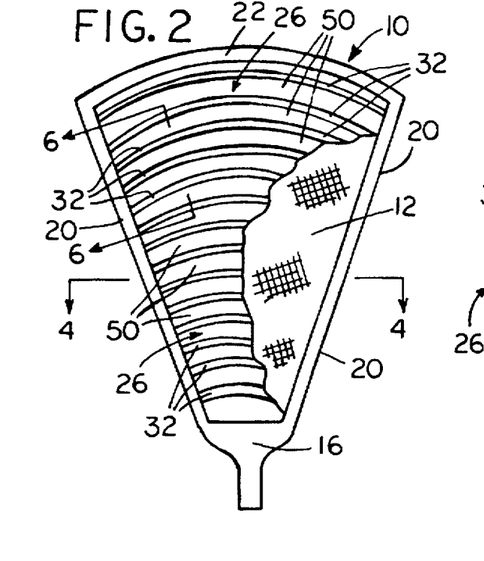
FIG. 2 is a side view of a broad side of one preferred embodiment of a sector in accordance with the present invention, showing the sector ready for installation in a disc filter apparatus.

In one embodiment of a sector 10 in accordance with the present invention, the flow channels 32 are curvilinear. As illustrated in FIG. 2, it is advantageous to form the flow channels 32 so that they are circular in shape and coaxial with an axis of rotation of the rotary disc filter.

Figure 3:
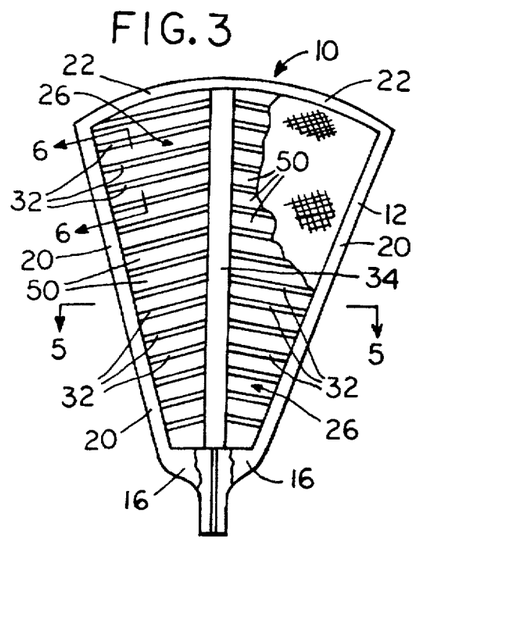
FIG. 3 is a side view of another embodiment of a sector that is similar to that of FIG. 2, except that the drainage channels are substantially linear rather than arcuate.
Figure 4:
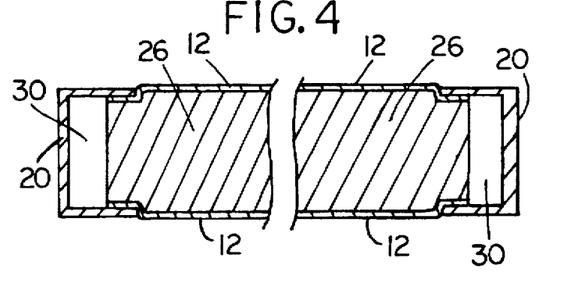
FIG. 4 is a cross section through the sector of FIG. 2 taken along line 4—4 of FIG. 2.

In another embodiment of a sector 10 in accordance with the present invention, the flow channels 32 are substantially linear. As illustrated in FIG. 3, the sector 10 is divided into two working sections, with each section having its own filter media support member 26, and the flow channels 32 are oriented substantially perpendicular to a central radial axis that bisects the filter media support member 26.

Figure 5:
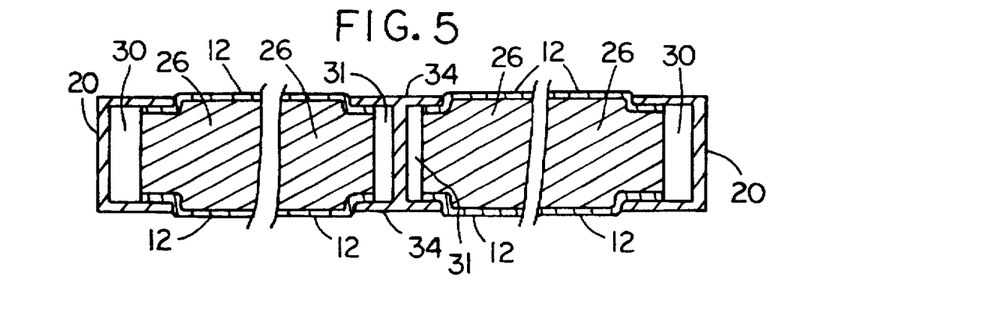
FIG. 5 is a cross section through the sector of FIG. 3 taken along line 5—5 of FIG. 3.

The division of each sector 10 into two working sections as shown in FIG. 3 is readily accomplished by providing an elongate divider member 34 that extends from the sector bell 16 to the elongate, arcuate, peripheral member 22. As best shown in FIG. 5, the divider member 34 has an H-shaped cross section, with two elongate troughs that face the opposite side channels 20 of the sector 10. The inner edges of the filter media support members 26 are received in the two elongate troughs of the H-shaped divider member 34 so that elongate fluid flow passages 31 are formed between the side edges of the support member 26 and the respective troughs of the H-shaped divider member 34. The fluid flow passages 31 are similar to the fluid flow passages 30 in the elongate side channels 20 at the radial sides of the sector 10, and both the fluid flow passages 31 and 30 communicate with the sector bell 16 so that fluid can flow from the passages 31 and 30 to the sector bell 16.

In another preferred embodiment of the invention as illustrated in FIGS. 7–10, a sector 10 is shown that can be connected directly to the central shaft 14 of the filter apparatus so as to eliminate the need of a sector bell. In the embodiment shown in FIGS. 7–10, the sector 10 comprises two elongate side channels 20 that extend substantially radially outwardly from the central shaft 14 of the rotary disc filter so that the side channels 20 diverge from each other to form the radial sides of the sector 10. Each side channel 20 defines an open trough that faces the interior of the sector 10. The two elongate side channels 20 are connected directly to the central shaft 14 of the rotary disc filter apparatus so that the two elongate side channels 20 are in direct flow communication with respective openings 21 (FIG. 10) of the central shaft 14 of the rotary disc filter apparatus. The openings 21 further communicate with a fluid handling system incorporated in the central shaft 14. The fluid handling system is well known in the prior art and is not shown in the drawings nor will it be further elaborated herein. Fluid flows directly from the troughs formed by the side channels 20 to the fluid handling system incorporated in central shaft 14 of the rotary disc filter apparatus.

An elongate, arcuate, peripheral member 22 extends between distal ends of the side channels 20 to form an arcuate perimeter of the sector 10. An elongate inner member 40 extends between the side channels 20 at a position closely adjacent to the central shaft 14 of the rotary disc filter apparatus. A substantially planar filter media support member 26 is positioned between the two elongate channels 22 and extends from the elongate inner member 40 to the peripheral member 22 so as to occupy the inner space of the sector 10.

Figure 9:
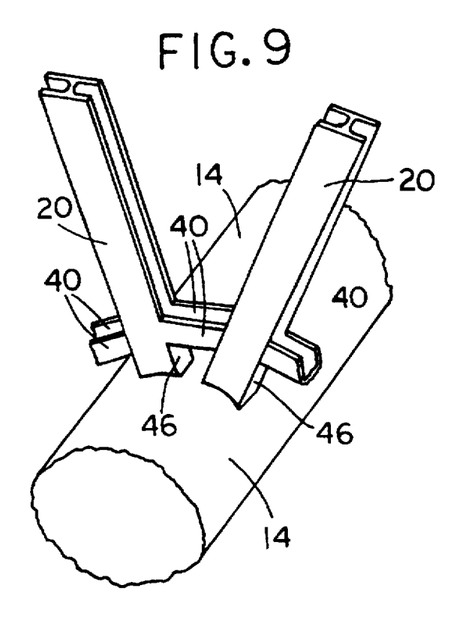
FIG. 9 is a pictorial view of the lower section of the sector of FIG. 7 that is connected to the shaft of the rotary disc filter, with the filter media and filter media support member being removed to show detail of the construction of the sector.
Figure 10:
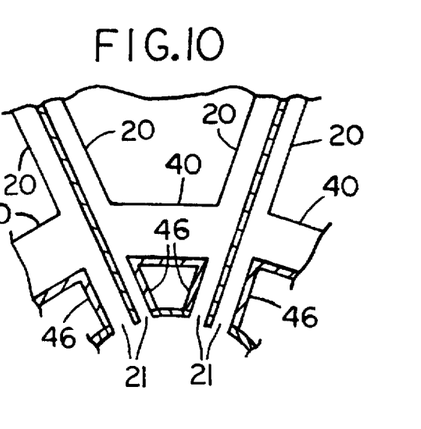
FIG. 10 is a horizontal cross section taken along line 10—10 of FIG. 9.

Means are provided for enclosing the otherwise open sides of the troughs of the two elongate side channels 20 of the embodiment illustrated in FIGS. 7-10 between the elongate inner member 40 and the central shaft 14 of the rotary disc filter apparatus. The portions of the elongate side channels 20 that extend between the elongate inner member 40 and the central shaft 14 of the rotary disc filter apparatus are thus formed into enclosed flow passages instead of open troughs. As illustrated in FIGS. 9 and 10, the means for enclosing the open sides of the troughs comprise plates 46 that are welded to the open sides of the trough and the lower side of the elongate inner member 40.

The elongate inner member 40 is preferably a U-shaped member having an open trough that faces radially away from the central shaft 14. The filter media support member 26 is received in the trough formed by the inner member 40 and is preferably spaced from the lower side of the inner member 40 so that a flow passage is created along the lower side of the inner member that extends between the opposite side channels 20. The filter media support member 26 is shown in its proper position in FIGS. 7 and 8. To allow illustration of the construction of the side channels 20 and the inner member 40, the filter media support member 26 is not shown in FIGS. 9 and 10.

Figure 7:
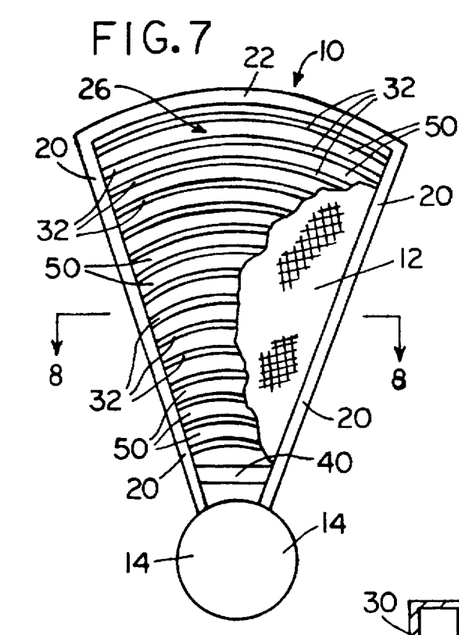
FIG. 7 is a side view of one broad side of a second embodiment of a sector in accordance with the present invention, showing the sector being connected directly to the central shaft of the disc filter apparatus.
Figure 8:
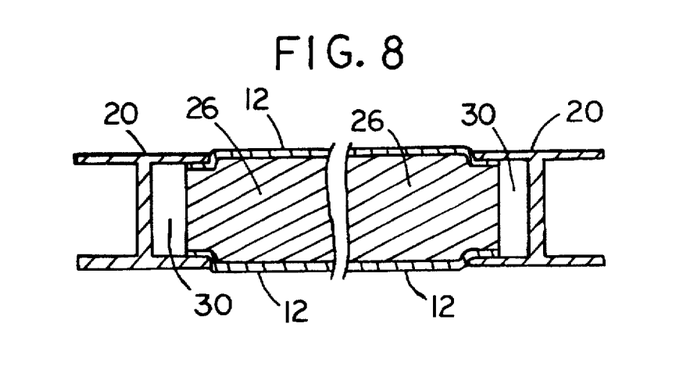
FIG. 8 is a cross section through the sector of FIG. 7 taken along ling 8—8 of FIG. 7.

As illustrated in FIG. 7, elongate flow channels 32 are formed on the opposite broad surfaces of the filter media support member 26. These flow channels 32 are curvilinear, but they could just as well be linear so as to be similar to the flow channels 32 of the embodiment of the invention shown in FIG. 3. A divider member 34 as shown in FIGS. 3 and 5 could also be provided in the embodiment of the sector 10 shown in FIGS. 7-10 is so desired to separate the sector 10 into two working sections. The divider member 34 would have essentially the same shape as the divider member 34 shown in the embodiment of FIGS. 3 and 5.

The flow channels 32 in the filter media support member 26 of the embodiment of the invention shown in FIGS. 7-10 direct fluid toward the side channels 20. The fluid then flows in the elongate passages 30 of the side channels directly to the central shaft 14 to be delivered directly to the fluid handling system incorporated in the central shaft 14. There is no need of a sector bell as is otherwise universally used in prior art disc filter apparatus to convey liquid from the sector 10 to the central shaft 14 of the filter apparatus.

As illustrated in FIGS. 7-10, it is advantageous to form the elongate side channels 20 so as to have a generally H-shaped cross section. The H-shaped members form two oppositely faced troughs, and a single elongate, H-shaped, side channel 20 can be employed in making adjacent sectors in the filter apparatus. The H-shaped member is equivalent to two U-shaped channels which are oriented back-to-back. Of course, two U-shaped channels can be used instead of a single H-shaped member if so desired.

Figure 6:
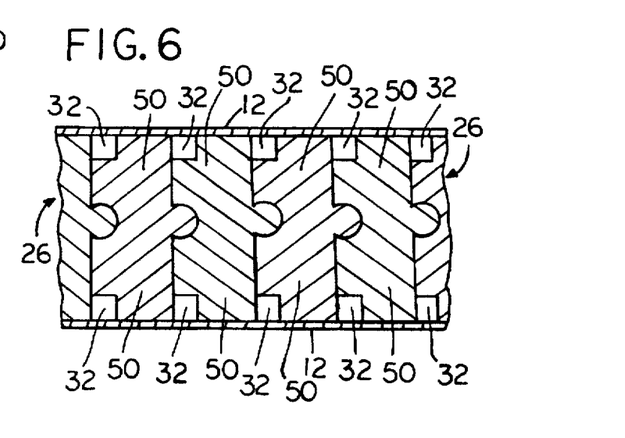
FIG. 6 is a cross section through a sector of the present invention taken along line 6—6 of either FIG. 2 or FIG. 3.

The filter media support member 26 used in any of the embodiments of the present invention is preferably formed from a plurality of elongate slats 50 having two opposite upper and lower sides and two opposite lateral sides. The slats 50 are arranged in side-by-side manner as best shown in FIG. 6 so that a first or upper side of a slat lies alongside a second or lower side of an adjacent slat, with the dimension between the opposite lateral sides of the slats being the thickness of the filter media support member 26. The lateral sides of the slats 50 are contoured so that elongate flow channels 32 are formed between the slats 50 at the opposite lateral sides of the slats when adjacent slats lie together in their side-by-side arrangement.

It is advantageous to provide engagement means on the opposite first or upper and second or lower sides of each of the slats 50 so that adjacent slats can engage each other at their adjacent first or upper and second or lower sides, respectively, to form an interengaged unit as illustrated in FIG. 6 of the drawings. As shown in FIG. 6, the engagement means comprises an interlocking tongue and groove system. The first or upper side of each slat 50 has an elongate tongue that is received in a corresponding groove in the second or lower side of an adjacent slat 50. As illustrated, the tongues and grooves are circular in shape and can be pushed or snapped together to engage each other. The tongue and grooves could have a more sharp shape such as mating triangles. If the tongue and grooves are of the sharp shape variety, the slats 50 must be assembled by sliding the tongue from one slat 50 into the end of a groove in an adjacent slat 50.

The slats 50 can be formed so that they are essentially linear, with the contoured channels formed therein in turn forming linear flow channels 32 of the filter media support member 26 as is illustrated in FIG. 3. The slats 50 can also be curved along their length so as to form arcs of circles that are substantially coaxial with the axis of rotation of the rotary disc filter. The contoured channels formed in such curved slats 50 form curved flow channels 32 of the filter support member 26 as illustrated in FIG. 2.

It should be noted that the filter media support member 26 as shown in FIGS. 2-8 of the drawings can also be used generally as a flat drainage member, such as a floor in a shower stall or other wet area. Such a drainage member is capable of conveying water from the drainage member while providing an upper working surface that is not submerged in water. The flat drainage member is formed from a plurality of elongate slats identical to the slats 50 of the filter media support member 26 shown in the drawings.

Figure 11:
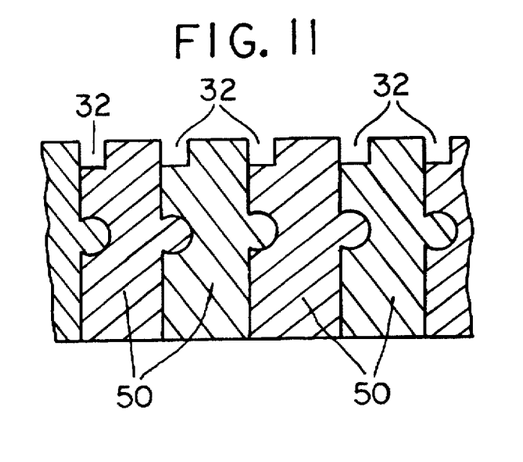
FIG. 11 is a cross section of a flat drainage member that is similar to the filter media support member of FIG. 3 but has drainage channels formed only on one surface thereof, with the cross section being taken along a similar line to line 5—5 of FIG. 3.

A cross section of such a drainage member is shown in FIG. 11. The slats 50 have two opposite first and second sides and two opposite top and bottom sides. The slats are arranged in side-by-side manner so that a first side of a slat lies alongside a second side of an adjacent slat.

Engagement means as discussed previously with respect to the filter media support member 26 are preferably formed on the opposite first and second sides of each of the slats 50 of the flat drainage member so that adjacent slats can engage each other at their adjacent first and second sides, respectively, to form an interengaged unit. As illustrated in FIG. 11, the top sides of the slats 50 of the flat member are contoured so that elongate flow channels 32 are formed between the slats 50 at the top sides of the slats when adjacent slats lie together in their side-by-side arrangement. The bottom sides of the slats 50 of the flat member need not be contoured and can be essentially planar as shown in FIG. 11. However, if so desired, the bottom sides of the slats 50 could also be contoured so that elongate flow channels are formed between the slats at the bottom sides thereof when adjacent slats lie together in their side-by-side arrangement.

I claim:

1. A sector for use in a rotary disc filter, said sector comprising
    two elongate side channels extending substantially radially outwardly from a central shaft of the rotary disc filter so that the side channels diverge from each other to form the radial sides of said sector, with each side channel defining an open trough that faces the interior of said sector;
    an elongate, arcuate, peripheral member that extends between distal ends of said side channels to form an arcuate perimeter of said sector;
    a substantially planar, filter media support member positioned between said two elongate channels so as to occupy the inner space of said sector;
    said filter media support member having its side edges received in said side channels so that elongate fluid flow passages are formed between said side edges and the trough formed by said side channels; and
    said filter media support member having elongate flow channels formed on opposite broad surfaces thereof so that the flow channels are substantially parallel with each other as well as being aligned in a direction from a radial axis through said filter media support member toward said elongate side channels so that substantially all of said flow channels open into said elongate side channels.

2. A sector in accordance with claim 1 which further comprises
    a hollow sector bell that is mounted to the shaft of the rotary disc filter;
    the two elongate side channels are attached to said sector bell so as to extend outwardly from said central shaft and said sector bell; and
    said filter media support member extends between said two elongate side channels and from said sector bell to said elongate, arcuate, peripheral member of said sector.

3. A sector in accordance with claim 1 wherein
    said two elongate side channels are connected directly to said central shaft of said rotary disc filter so that the elongate side channels are in direct flow communication with said central shaft of said rotary disc filter, wherein fluid flows directly from said troughs formed by said side channels to said central shaft of said rotary disc filter;
    an elongate inner member extends between said side channels at a position adjacent to said central shaft of said rotary disc filter;
    said filter support member extends between said two elongate channels and from said inner elongate member to said elongate peripheral member of said sector; and
    means are provided for enclosing the otherwise open troughs of said two elongate side channels between said elongate inner member and said central shaft of said rotary disc filter to form the portions of said elongate side channels that extend between said elongate inner member and said central shaft of said rotary disc filter into enclosed flow passages.

4. A sector in accordance with claim 3 wherein the flow channels are substantially linear.

5. A sector in accordance with claim 4 wherein the flow channels are oriented substantially perpendicular to a central radial axis that bisects said filter media support member.

6. A sector in accordance with claim 3 wherein the flow channels are curvilinear.

7. A sector in accordance with claim 6 wherein the flow channels are circular in shape and coaxial with an axis of rotation of the rotary disc filter.

8. A sector in accordance with claim 7 wherein
    said filter media support member is formed from a plurality of elongate slats having two opposite upper and lower sides and two opposite lateral sides, said slats being arranged in side-by-side manner so that an upper side of a slat lies alongside a lower side of an adjacent slat, with the dimension between the opposite lateral sides of said slats being the thickness of said filter media support member;
    said slats are curved along their length so as to form arcs of circles that are substantially coaxial with the axis of rotation of said rotary disc filter; and
    said lateral sides of said slats are contoured so that elongate flow channels are formed between said slats at the opposite lateral sides of said slats when adjacent slats lie together in their side-by-side arrangement.

9. A sector in accordance with claim 8 wherein engagement means are is formed on the opposite upper and lower sides of each of said slats so that adjacent slats can engage each other at their adjacent upper and lower sides, respectively, to form an interengaged unit.

10. A sector in accordance with claim 3 wherein
    said flow channels are substantially linear;
    said filter media support member is formed from a plurality of elongate slats having two opposite upper and lower sides and two opposite lateral sides, said slats being arranged in side-by-side manner so that an upper side of a slat lies alongside a lower side of an adjacent slat, with the dimension between the opposite lateral sides of said slats being the thickness of said filter media support member; and
    said lateral sides of said slats are contoured so that elongate flow channels are formed between said slats at the opposite lateral sides of said slats when adjacent slats lie together in their side-by-side arrangement.

11. A sector in accordance with claim 10 wherein engagement means are formed on the opposite upper and lower sides of each of said slats so that adjacent slats can engage each other at their adjacent upper and lower sides, respectively, to form an interengaged unit.

12. A sector in accordance with claim 1 wherein the flow channels are substantially linear.

13. A sector in accordance with claim 12 wherein the flow channels are oriented substantially perpendicular to a central radial axis that bisects said filter media support member.

14. A sector in accordance with claim 1 wherein the flow channels are curvilinear.

15. A sector in accordance with claim 14 wherein the flow channels are circular in shape and coaxial with an axis of rotation of the rotary disc filter.

16. A sector in accordance with claim 15 wherein said filter media support member is formed from a plurality of elongate slats having two opposite upper and lower sides and two opposite lateral sides, said slats being arranged in side-by-side manner so that an upper side of a slat lies alongside a lower side of an adjacent slat, with the dimension between the opposite lateral sides of said slats being the thickness of said filter media support member;

said slats are curved along their length so as to form arcs of circles that are substantially coaxial with the axis of rotation of said rotary disc filter; and said lateral sides of said slats are contoured so that elongate flow channels are formed between said slats at the opposite lateral sides of said slats when adjacent slats lie together in their side-by-side arrangement.

17. A sector in accordance with claim 16 wherein engagement means are is formed on the opposite upper and lower sides of each of said slats so that adjacent slats can engage each other at their adjacent upper and lower sides, respectively, to form an interengaged unit.

18. A sector in accordance with claim 1 wherein said flow channels are substantially linear;

said filter media support member is formed from a plurality of elongate slats having two opposite upper and lower sides and two opposite lateral sides, said slats being arranged in side-by-side manner so that an upper side of a slat lies alongside a lower side of an adjacent slat, with the dimension between the opposite lateral sides of said slats being the thickness of said filter media support member; and said lateral sides of said slats are contoured so that elongate flow channels are formed between said slats at the opposite lateral sides of said slats when adjacent slats lie together in their side-by-side arrangement.

19. A sector in accordance with claim 18 wherein engagement means are formed on the opposite upper and lower sides of each of said slats so that adjacent slats can engage each other at their adjacent upper and lower sides, respectively, to form an interengaged unit.

20. A sector for use in a rotary disc filter, said sector comprising two elongate side channels extending substantially radially outwardly from a central shaft of the rotary disc filter so that the side channels diverge from each other to form the radial sides of said sector, with each side channel defining an open trough that faces the interior of said sector;

an elongate, arcuate, peripheral member that extends between distal ends of said side channels to form an arcuate perimeter of said sector;

a substantially planar filter media support member positioned between said two elongate channels so as to occupy the inner space of said sector;

said filter media support member being formed from a plurality of elongate slats having two opposite first and second sides and two opposite top and bottom sides, said slats being arranged in side-by-side manner so that a first side of a slat lies alongside a second side of an adjacent slat; and said lateral sides of said slats are contoured so that elongate flow channels are formed between said slats at the opposite lateral sides of said slats when adjacent slats lie together in their side-by-side arrangement.

21. A sector in accordance with claim 20 wherein engagement means are formed on the opposite first and second sides of each of said slats so that adjacent slats can engage each other at their adjacent first and second sides, respectively, to form an interengaged unit.

22. A sector in accordance with claim 20 which further comprises a hollow sector bell that is mounted to the shaft of the rotary disc filter;

the two elongate side channels are attached to said sector bell so as to extend outwardly from said central shaft and said sector bell; and said filter media support member extends between said two elongate channels and from said sector bell to said elongate, peripheral member of said sector.

23. A sector in accordance with claim 20 wherein said two elongate side channels are connected directly to said central shaft of said rotary disc filter so that the elongate side channels are in direct flow communication with said central shaft of said rotary disc filter, wherein fluid flows directly from said troughs formed by said side channels to said central shaft of said rotary disc filter;

an elongate inner member extends between said side channels at a position adjacent to said central shaft of said rotary disc filter;

said filter support member extends between said two elongate channels and from said inner elongate member to said elongate peripheral member of said sector; and means are provided for enclosing the otherwise open troughs of said two elongate side channels between said elongate inner member and said central shaft of said rotary disc filter to form the portions of said elongate side channels that extend between said elongate inner member and said central shaft of said rotary disc filter into enclosed flow passages.

24. A sector for use in a rotary disc filter, said sector comprising two elongate side channels extending substantially radially outwardly from a central shaft of the rotary disc filter so that the side channels diverge from each other to form the radial sides of said sector, with each side channel defining an open trough that faces the interior of said sector, each of said two elongate side channels being connected directly to said central shaft of said rotary disc filter so that the two elongate side channels are in direct flow communication with said central shaft of said rotary disc filter, wherein fluid flows directly from said troughs formed by said side channels to said central shaft of said rotary disc filter;

an elongate, arcuate, peripheral member that extends between distal ends of said side channels to form an arcuate perimeter of said sector;

an elongate inner member extending between said side channels at a position closely adjacent to said central shaft of said rotary disc filter;

a substantially planar filter media support member positioned between said two elongate channels and extending from said elongate inner member to the peripheral member so as to occupy the inner space of said sector; and means are provided for enclosing the otherwise open troughs of said two elongate side channels between said elongate inner member and said central shaft of said rotary disc filter to form the portions of said elongate side channels that extend between said elongate inner member and said central shaft of said rotary disc filter into enclosed flow passages.

25. A flat member that has drainage channels in its surface, said member being formed from a plurality of elongate slats having two opposite first and second lateral sides and two opposite top and bottom sides, said slats being arranged in side-by-side manner so that a first side of a slat lies alongside and abuts a second side of an adjacent slat;

engagement means formed on the opposite first and second sides of each of said slats so that adjacent slats can engage each other at their adjacent first and second sides, respectively, to form an interengaged unit; and said top sides of said slats are contoured so that elongate flow channels are formed between said slats at the top sides of said slats when adjacent slats lie together in their side-by-side arrangement.

26. A flat member in accordance with claim 25 wherein said bottom sides of said slats are contoured so that elongate flow channels are formed between said slats at the bottom sides of said slats when adjacent slats lie together in their side-by-side arrangement.

* * * * *